Patented Nov. 6, 1928.

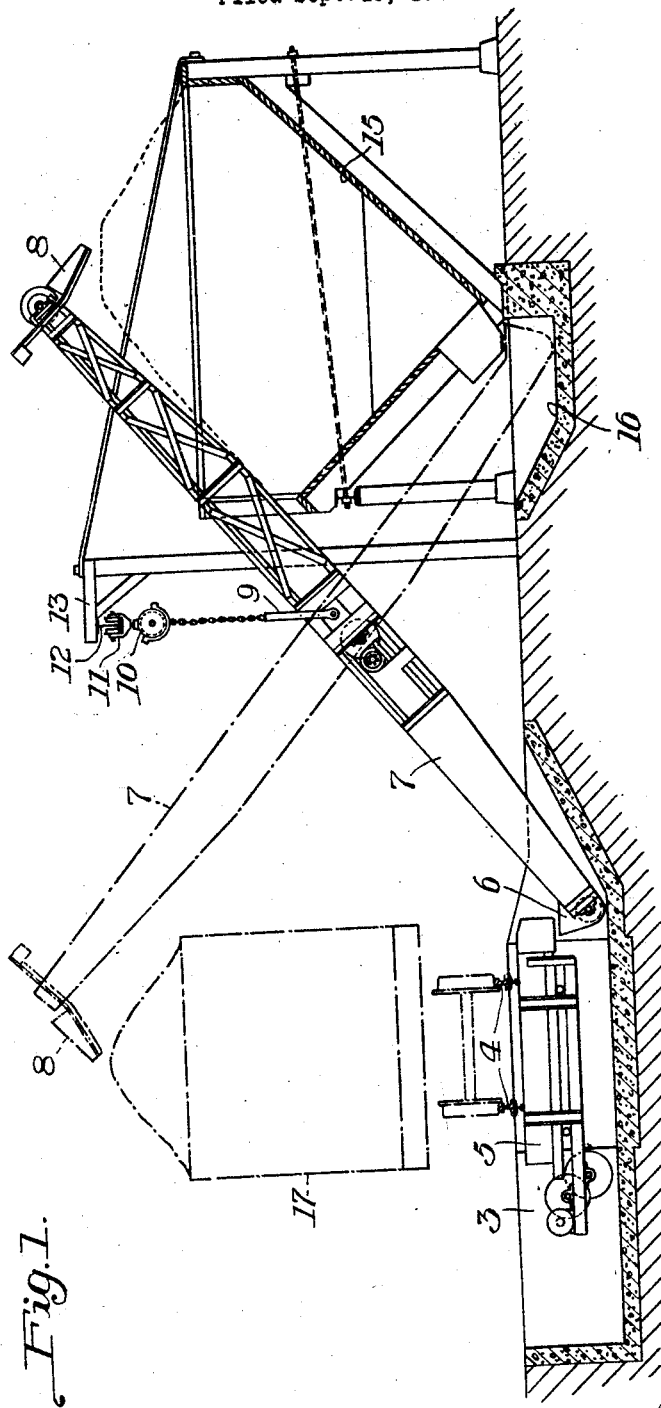

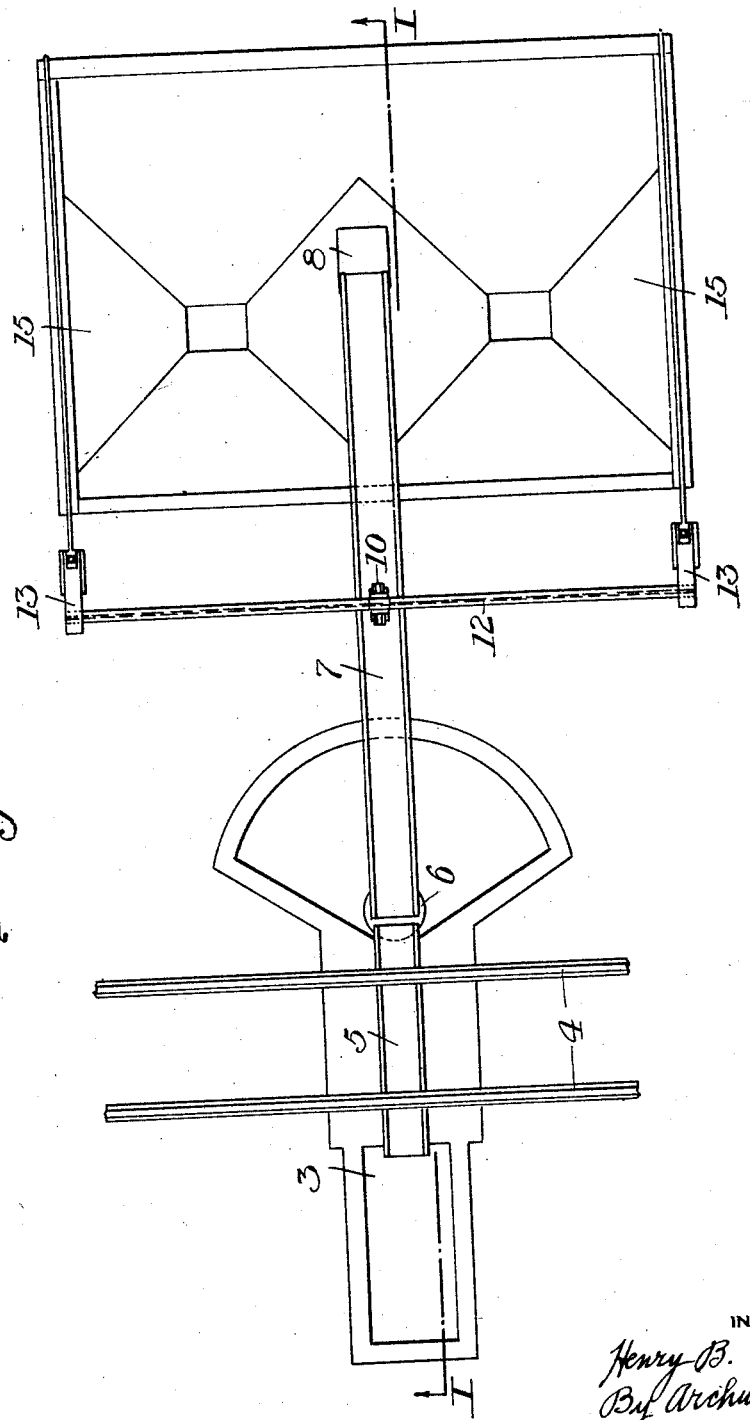

1,690,603

UNITED STATES PATENT OFFICE.

HENRY B. WALKER, OF MARION, OHIO, ASSIGNOR TO THE FAIRFIELD ENGINEERING COMPANY, OF MARION, OHIO, A CORPORATION OF OHIO.

METHOD OF AND APPARATUS FOR HANDLING MATERIAL.

Application filed September 15, 1926. Serial No. 135,550.

My invention relates to conveyor apparatus for handling materials such as coal, and has especial reference to the storing of coal and the loading of the same into locomotive tenders or cars.

My invention has for one of its objects the provision of an improved form of apparatus whereby coal may be transferred from a point beneath a railroad track to a storage bin and thereafter transferred from said bin to a car or a locomotive tender on said track.

Another object of my invention is to simplify and improve generally the methods of an apparatus for handling coal and the like.

One form of appartus by which my invention may be practiced is shown in the accompanying drawing, wherein—Fig. 1 is a side elevational view thereof, taken on the line 1—1 of Fig. 2, and Fig. 2 a plan view.

As shown in the drawing, an unloading pit 3 is provided beneath railroad tracks 4. The coal to be stored is dumped at the pit 3, upon the feeding device 5 which may be of conventional form, somewhat as shown in the Cave and Blenko Patent 1,521,276. The feeding device advances the coal toward the right to effect discharge thereof into a hopper 6 that is mounted in the lower end of an inclined conveyor frame 7. An endless bucket conveyor of any usual form is carried by the frame 7, so as to convey coal or other material from the hopper 6 to a discharge chute 8. The frame 7 is pivotally supported upon a hanger 9 that is connected to a block 10. The block 10 has swivel connection with a carrier or wheeled bracket 11. The wheels on the bracket 11 are supported upon the bottom flanges of an I beam 12 which serves as a track and is supported by frame work 13.

When the conveyor occupies the position shown in full lines, it will convey coal from the feeding device 5 to the chute 8, from whence it falls into a bin 15 whose bottom is inclined to produce a hopper effect. A pit 16 is provided beneath the lower end of the bin 15, into which the lower end of the conveyor may be swung, as indicated by dotted lines, when it is desired to transfer coal from the bin to a locomotive tender 17. As shown in Fig. 2, I may provide two or more bins 15 disposed alongside of the track 12, and the conveyor may be moved along the track from one bin to the other. It may also be found desirable to move the conveyor along the track 12 in order to permit convenient reversal of its position, as when the conveyor is at a point near one of the frame members 13, and there is insufficient room to permit turning thereof.

It will be understood that the bins may be filled from time to time, from cars that are positioned over the unloading pit 3 and that after the car is removed, a locomotive tender may be pushed into position to receive a load, and the conveyor swung from the position indicated in full lines to that indicated by dotted lines. It will also be understood that the device may be employed for transferring coal or the like from one car to another car, and its use is not merely limited to the coaling of locomotives.

It will be understood that the transfer device 5 may be dispensed with and that the coal may be dumped into a hopper beneath the tracks 4 from which it can be carried away by the conveyor into the bin 15. This hopper could be constructed in a manner similar to the bin 15.

I claim as my invention:

Apparatus for transferring material from a point beneath a railroad track into a vehicle on said track, comprising a bin located to one side of said track and having a discharge opening in its bottom portion, a conveyor, and means for pivotally supporting the same at its mid portion, on vertically alined horizontal and vertical axes and between the said track and bin, and the conveyer also being of such length that it may be so positioned as to permit either transfer of material from beneath the track to the top of the bin or frame bottom of the bin into a vehicle mounted on the track.

In testimony whereof I, the said HENRY B. WALKER, have hereunto set my hand.

HENRY B. WALKER.